United States Patent [19]

Bourbeau

[11] 4,428,407
[45] Jan. 31, 1984

[54] TREE-PROCESSING APPARATUS

[76] Inventor: Claude Bourbeau, 855 - 27th St., St. Georges-Ouest, Canada

[21] Appl. No.: 322,363

[22] Filed: Nov. 17, 1981

[51] Int. Cl.$^3$ .......................... A01G 23/02; B27C 9/00
[52] U.S. Cl. .................................... 144/2 Z; 144/343; 212/183; 414/686
[58] Field of Search ................. 144/2 Z, 30, 338, 343; 212/183; 414/686, 718, 918

[56] References Cited

U.S. PATENT DOCUMENTS

| | | |
|---|---|---|
| 3,482,613 | 12/1969 | Jordan . |
| 3,635,266 | 1/1972 | Eriksson . |
| 3,796,241 | 3/1974 | Golob et al. . |
| 3,894,568 | 7/1975 | Windsor . |
| 3,913,756 | 10/1975 | Barron et al. ........................ 414/718 |
| 4,016,688 | 4/1977 | Tiffin et al. .......................... 414/718 |
| 4,130,151 | 12/1978 | Ericsson .............................. 144/2 Z |
| 4,291,734 | 9/1981 | Hammond .......................... 144/2 Z |
| 4,350,189 | 9/1982 | Duchesne ............................ 144/343 |

FOREIGN PATENT DOCUMENTS

| | | | |
|---|---|---|---|
| 1055366 | 5/1979 | Canada . | |
| 791537 | 12/1980 | U.S.S.R. ............................. | 144/2 Z |

Primary Examiner—W. D. Bray

[57] ABSTRACT

The tree-processing unit includes a tubular member detachably secured to the boom support of a conventional motorized equipment, an elongated boom extending through both ends of the tubular member, guide means located within the tubular member for guiding and supporting the boom through the tubular member, and hydraulically-operated means mounted on the tubular member and on the front end of the boom for gripping and delimbing a felled tree. The hydraulic lines interconnecting the hydraulically-operated means located at the front end of the boom and the tubular member, are maintained in a tight condition all the time to prevent tangling of the lines with the equipment and other obstacles on the working site. A guide mechanism located within the tubular member includes a plurality of roller bogeys. A tubular member is hingedly mounted on the boom support, so as to permit pivotal of the boom support about its horizontal axis to a position substantially parallel to the boom and so reduce the height of the boom above ground to a minimum. Two pairs of jaws are pivotally mounted, one on the tubular member and the other on the front end of the boom, for gripping and delimbing felled trees. The jaws of each pair are mounted in a longitudinally offset position and means are provided for interchanging the relative position of the jaws, so that both jaws can be easily seen by an operator seated at the operator control station, whether this control station is located on the right hand or on the left hand of the boom.

4 Claims, 11 Drawing Figures

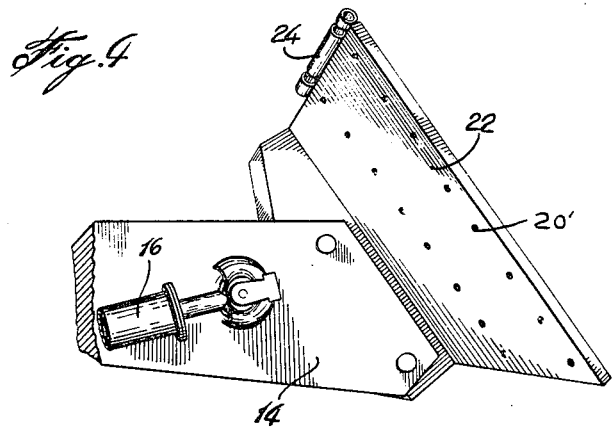
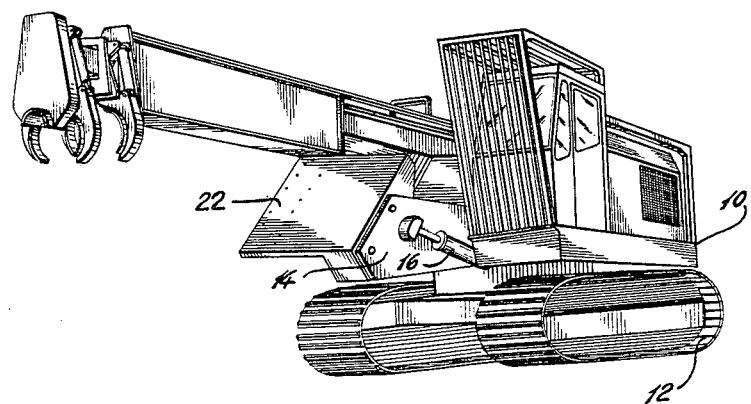

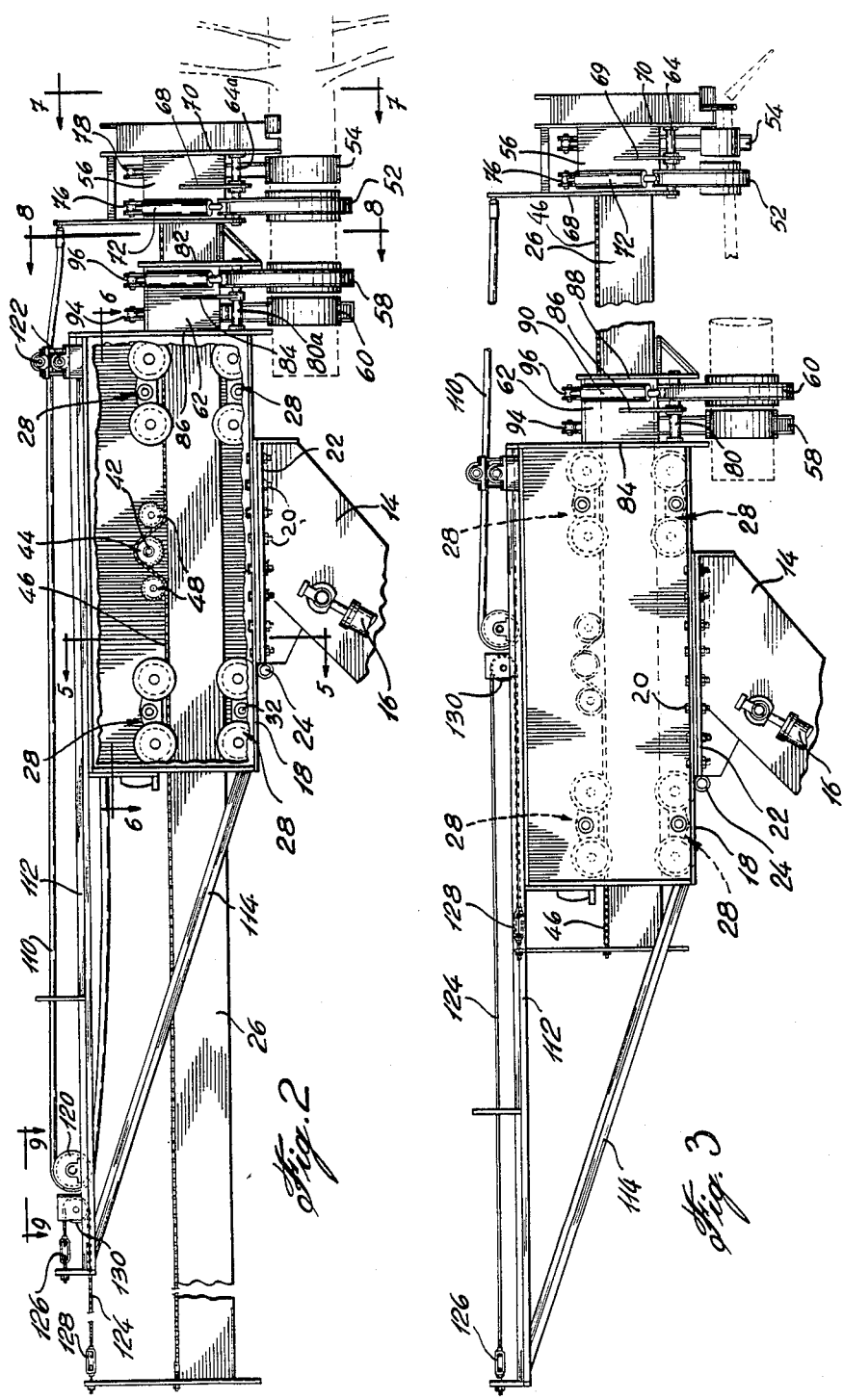

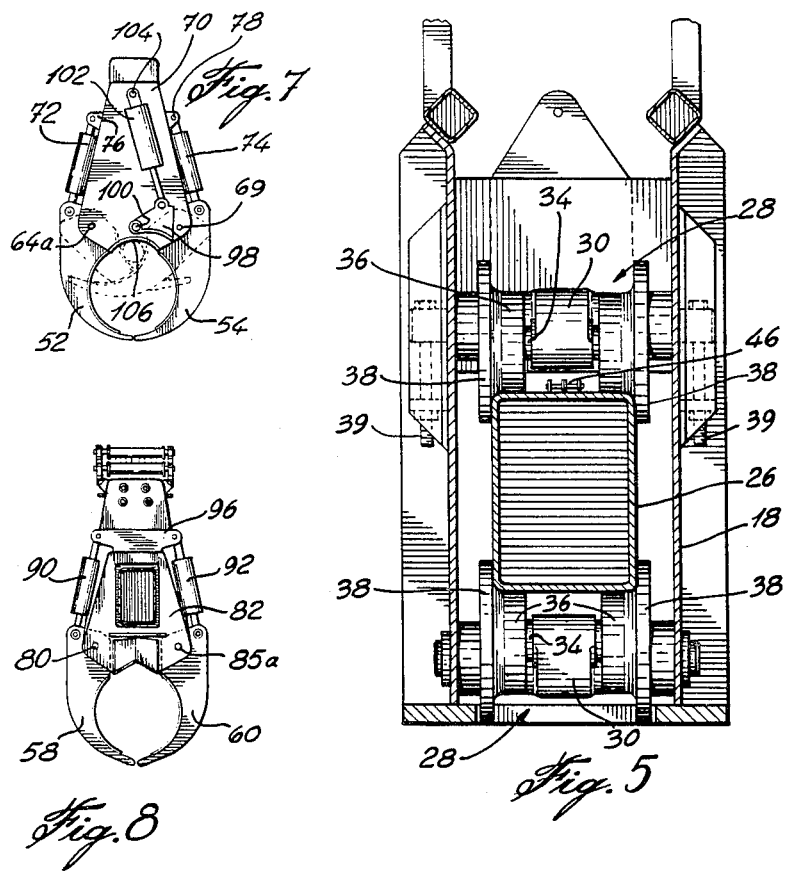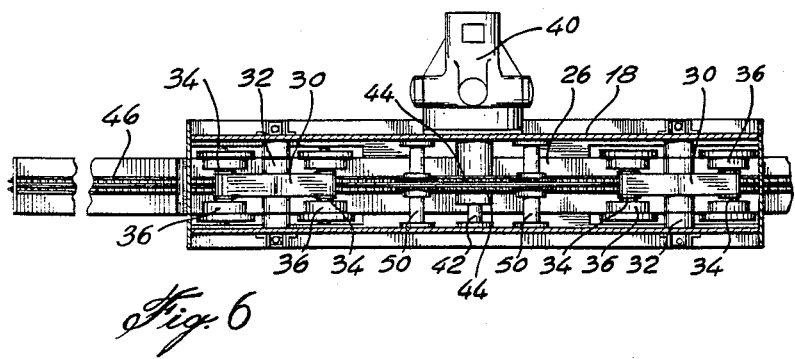

TREE-PROCESSING APPARATUS

This invention relates to a tree-processing apparatus and, more particularly, to a tree-processing apparatus which grips, delimbs and cuts the top of felled trees.

Tree-processing apparatuses of the above type are well known and generally include, as an integral part thereof, their own motorized equipment as well as the necessary hydraulic power supply for operating the gripping, delimbing and topping mechanisms. These machines are therefore expensive. One tree-processing unit is known, which can be adapted to be detachably mounted on a conventional excavator equipment. This unit, in addition to increase the capabilities of the excavator equipment, greatly reduces the cost of the tree-processing apparatus. The above unit is disclosed in Canadian Patent No. 1,055,366, issued May 29, 1979. It has, however, a number of drawbacks, including a long boom which requires tension cables above the boom for strengthening the same. These cables, as well as the long hydraulic lines required for operating the gripping and delimbing jaws located at the front of the boom, often get tangled in the trees and the other overhead obstacles normally encountered on the working site. The boom guide means are also exposed and subject to being jammed and damaged by branches cut from the trees during the delimbing operation. Furthermore, the unit, when assembled to the motorized equipment, is very high above ground and cannot be moved on a trailer on the roads under overhead bridges amd other obstacles. Finally, the longitudinally offset gripping and delimbing jaws which are located on the front end of the boom and on the boom support, are mounted so that they can be easily seen and operated from one side of the boom only, thus restricting the use of existing motorized equipment having the operator control station located on that side only.

It is therefore the object of the present invention to provide a tree-processing unit which is relatively simple in construction, rugged and which does not have the drawbacks of the known units.

The tree-processing unit in accordance with the invention generally comprises a tubular member detachably secured to the regular boom support of a conventional motorized equipment, an elongated boom extending through both ends of the tubular member, guide means located within the tubular member for supporting and guiding said boom through the tubular member, a hydraulically-operated means mounted on the tubular member and on the front end of the boom for gripping and delimbing a felled tree.

In one aspect of the present invention, hydraulic lines are provided for interconnecting the hydraulically-operated means located on the front end of the boom to the tubular member, and means are mounted on the tubular member for maintaining the hydraulic lines in a tight condition to prevent tangling of the hydraulic lines with the equipment and other obstacles on the working site.

In a preferred embodiment of the invention, such means for maintaining the hydraulic lines in a tight condition comprises two parallel rails mounted on the top of the tubular member, a carriage mounted for longitudinal movement on the rails, a drum rotably mounted on the carriage and around which the hydraulic lines are passed, means for securing one end of the hydraulic lines to the front end of the boom, and the other end of the lines to the tubular member after passing the lines around the drum, a sprocket wheel rotatably mounted on the carriage and a sprocket chain attached at one end to the ear end of the boom, and at its other end to the tubular member after passing through the sprocket wheel, for moving the carriage in the same direction as the boom so as to take up any slack in the hydraulic lines due to movement of the boom. Guide means are also preferably located on the tubular member for guiding the hydraulic lines onto the drum.

In a second aspect of the present invention, the guide means, located within the tubular member for supporting and guiding the boom through the tubular member, includes a plurality of roller bogeys having rollers partially encircling a portion of the outer surface of the boom for guiding the boom through the tubular member.

In a preferred embodiment of the invention, the boom is of rectangular cross-section and at least one roller engages the top and bottom walls of the boom at each corner of the boom, and each roller is provided with a flange engaging the side of the top or bottom walls of the boom at each corner of the boom. Each roller bogey preferably comprises an elongated bar, a central transverse axle journalled in the walls of the tubular member, a transverse shaft adjacent each end of the bar and a pair of rolers rotatably mounted on each shaft, one on each side of the bar.

In a third aspect of the present invention, the tubular member supporting the boom is hingedly mounted on the boom support of the motorized equipment, so as to permit pivotal of the boom support about its horizontal axis to a position substantially parallel to the boom and so reduce the height of the boom above ground to a minimum to permit transportation of the motorized equipment on a trailer under bridges and other overhead obstacles.

In a preferred embodiment of the invention, the means for hingedly mounting the tubular member on the top end of the boom support comprises a plate which extends outwardly from the boom support by a predetermined distance, so as to permit movement of the trunk of a tree being processed along the side of the boom support during operation of the hydraulically-operated means, so as to reduce the overall length of the boom required for processing normal trees.

In a fourth aspect of the present invention, the hydraulically-operated means for gripping and delimbing felled trees consists of separate pairs of jaws pivotally mounted on the tubular member and on the front end of the boom. The jaws of each pair are mounted in a longitudinally-offset position and means are provided for interchanging the relative position of the jaws, so that both jaws can be easily seen from the operator seated at the operator control station, whether the control station is on one side or on the other side of the boom.

In a preferred embodiment of the invention, the means for interchanging the position of the jaws includes a pair of pivotal connections located on each side of the tubular member and on the front end of the boom, and means for installing the jaws of each pair on one or the other of the pivotal connections, depending on which side of the boom support the operator control station is located.

The invention will now be disclosed, by way of example, with reference to the accompanying drawings, in which:

FIG. 1 illustrates a perspective view of the tree-processing apparatus in accordance with the invention in a transport position;

FIGS. 2 and 3 illustrate side views of the tree-processing unit in accordance with the invention at its two extreme operating positions, the jaws being in a position such that the operator's cabin is located behind the boom support and the tubular member;

Figure 9:
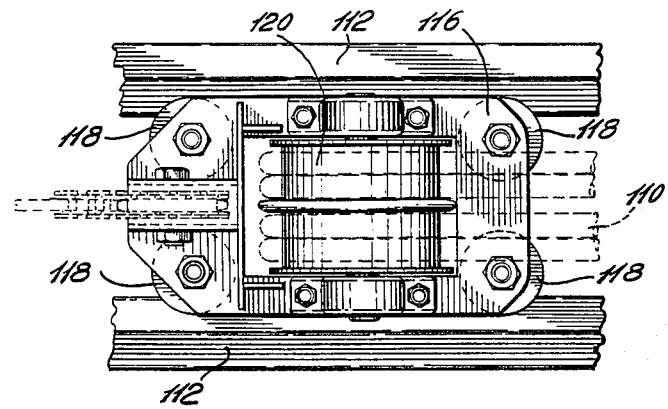
Figure 10:
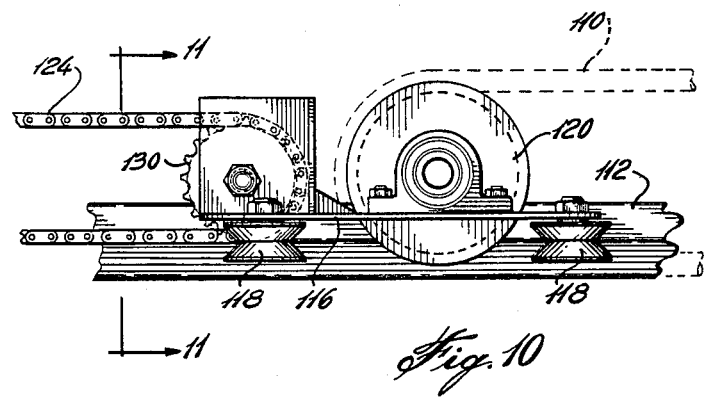

FIG. 4, seen on the first sheet of the drawings, illustrates a perspective view of part of the boom support and the plate used for mounting the tubular member on said boom support;

FIG. 5 illustrates a view taken along line 5—5 of FIG. 2;

FIG. 6 illustrates a view taken along line 6—6 of FIG. 2;

FIG. 7 illustrates a view taken along line 7—7 of FIG. 2;

FIG. 8 illustrates a view taken along line 8—8 of FIG. 2;

FIG. 9 illustrates a view taken along line 9—9 of FIG. 2;

FIG. 10 illustrates a side view of the apparatus shown in FIG. 9; and

Figure 11:
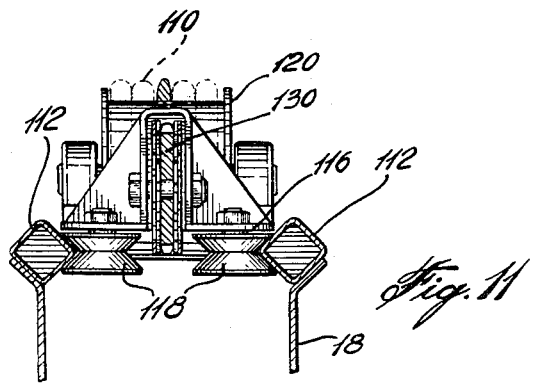

FIG. 11 illustrates a view taken along line 11—11 of FIG. 10.

Referring to FIG. 1 of the drawings, there is shown an overall view of a tree-processing unit in accordance with the invention mounted on a conventional hydraulically-operated excavator equipment having a main base 10 mounted for movement, about a vertical axis, on a pair of tracks 12, and a boom support 14 pivotally mounted on the main base about a horizontal axis. The boom support is operated by two hydraulic cylinders 16 from the regular hydraulic power supply of the excavator equipment.

Referring to FIGS. 2 to 5, the tree-processing unit comprises a tubular member 18 which is secured by means of bolts 20 to a plate 22, which is itself secured to the upper end of the boom support 14 by any suitable means (not shown).

In accordance with one feature of the present invention, the tubular member 18 is connected to the edge of plate 22 by means of a hinge 24 which, after removal of the bolts 20, permits pivoting of the boom support to a substantially horizontal position, thus permitting the height of the processing unit to be reduced to a minimum and allowing road transportation on a trailer of the processing unit readily assembled to the excavator equipment.

Referring again to FIGS. 2 and 3 and FIGS. 5 and 6, an elongated boom 26 extends through both ends of tubular member 18 and is guided by means of four sets of roller bogeys 28. Each roller bogey comprises an elongated bar member 30 which is mounted on a central transverse axle 32 journalled on the lateral walls of the tubular member. A transverse shaft 34 is mounted adjacent each end of the bar member 30 and a pair of rollers 36 are rotatably mounted on each shaft, one on each side of bar member 30. There is a separate set of roller bogeys engaging the top and bottom walls of the boom 26 at each end of tubular member 18. The wheels of each bogey are positioned on their respective shaft, so as to engage the corners of the boom and, in accordance with another feature of the present invention, have flanges 38 engaging the walls of the boom, so as to partially encircle the boom and positively guide the boom both horizontally and vertically during its movement through the tubular member. The central axis 32 of each upper set of roller bogeys may be adjusted by means of bolts 39, so as to tightly engage the boom 26.

The boom is moved within the tubular member 18 by means of a hydraulic motor 40, having its output shaft connected to a shaft 42 journalled within the tubular member 18 and carrying a pair of sprocket wheels 44. A double sprocket chain 46 is positioned on the top of the boom 26 and attached at both ends of the boom. The sprocket chain is coupled to sprocket wheels 44 through two idle sprocket wheels 48, each mounted on a shaft 50 journalled on the inside walls of the tubular member. Rotation of drive wheel 44, in one direction or the other, thus moves the boom 26 in one direction or the other within the tubular member 18.

Referring again to FIGS. 2 and 3 and to FIGS. 7 and 8, a pair of gripping jaws 52 and 54 are mounted on a tubular extension 56 located at the front end of the boom 26 and an identical pair of jaws 58 and 60 are mounted on another extension 62 located at the front end of the tubular member 18. The jaws 52 and 54 are longitudinally offset and jaw 52 is pivotally mounted on a shaft 64 located between parallel transverse plates 66 and 68 extending from the side walls of extension 56, whereas jaw 54 is pivotally mounted on a shaft 69 between parallel transverse plates 68 and 70. The jaws 52 and 54 are operated by hydraulic cylinders 72 and 74 respectively interconnecting each jaw to the opposite ends of two parallel transverse members 76 and 78 secured across extension 56. The position of the jaws 52 and 54 shown in FIG. 2 of the drawings is for an operator control station located on the left-hand side of the boom, in order to permit the operator to see both jaws. If the processing unit is installed on an excavator equipment having an operator control station located on the right-hand side of the boom, the relative position of the jaws 52 and 54 may be interchanged in accordance with another feature of the present invention. For that purpose, an additional shaft 64a is provided between plates 68 and 70 in line with shaft 64 and transverse member 78 is provided with suitable means for attaching cylinder 72, so as to permit installation of the jaw 52 either between plates 66 and 68 or between plates 68 and 70. An additional shaft (not shown) is also mounted in line with shaft 69 between plates 66 and 68 for installation of jaw 54 between plates 66 and 68. Similarly, transverse member 76 is provided with suitable means for attaching cylinder 74 between plates 66 and 68.

The jaws 58 and 60 mounted on the extension 62 of the tubular member 18 are also longitudinally offset and jaw 58 is pivotally mounted on a shaft 80 journalled between parallel transverse plates 82 and 84 extending from the side walls of the extension 62, whereas the jaw 60 is journalled on a shaft between plates 84 and 86. The jaws 58 and 60 are operated by hydraulic cylinders 90 and 92, respectively interconnecting each jaw to the opposite ends of two separate parallel transverse members 94 and 96 secured across the extension 62. The relative position of the jaws 58 and 60 may also be interchanged in the same manner as jaws 52 and 54 of extension 56. For that purpose, an additional shaft 80a is provided between plates 84 and 86 and an additional shaft 85a (FIG. 8) between plates 82 and 84. Furthermore, transverse members 94 and 96 are provided with means for attaching the hydraulic cylinder 90 and 82 at their top position.

Referring to FIG. 7, the front plate 70 of the extension 56 is further provided with means for topping the end of a tree. This means comprises a cutter 98, which is pivotally mounted on an axle 100 secured to plate 70 and which is operated by a hydraulic cylinder 102 secured to another axle 104 extending from the top portion of plate 70.

A cutting edge 106 is provided at the lower end of plate 70 for cooperation with the cutting edges of the gripping jaws when they are closed about a tree to encircle the tree and delimb it when the tree is moved relative to the above edges.

The hydraulic cylinders 72, 74 and 102 located on extension 56 are connected to the hydraulic power supply on the excavator equipment by means of hydraulic lines 110 which must be long enough to accommodate full extension of the boom 26. To prevent tangling of the hydraulic lines with the equipment and other obstacles on the working site, applicant has provided, in accordance with another aspect of the present invention, means for maintaining such hydraulic lines in a tight condition at all times. This means consists of a pair of rails 112 secured to the top of the tubular member and extending back for a predetermined distance. The rear end of the rails 112 is supported by bracing 114. A carriage 116, as shown in FIGS. 10, 11 and 12, is mounted on the rails 112 and provided with wheels 118 engaging the rails. A drum 120 is rotatably mounted on carriage 116 and the hydraulic lines 110 are partially wound around such drum. The hydraulic lines are attached at one end to plate 68 forming part of extension 56 of the boom, and their other end is attached to tubular member 18. The hydraulic lines are also guided above the rails 112 by guide rollers 122. The looseness in the hydraulic lines 110, due to movement of the boom, is taken by movement of the carriage in the same direction by means of a sprocket chain 124, which is attached at one end to the rear end of the boom by means of a buckle 128, and at its other end to the rear end of the rails 110 by means of a buckle 126. The sprocket chain is passed through a sprocket wheel 130 which is rotatably mounted on the rear end of carriage 116.

In operation, with the tree-processing unit installed on the end of the boom support 14, the boom 26 is extended by operation of hydraulic motor 40. The boom is moved over a felled tree by maneuvering the regular excavator equipment and the jaws 52 and 54 on the front extension of the boom are closed by operation of the cylinders 72 and 74 to grip the tree. In order to permit the operator to clearly see the tree as it is being gripped by jaws 52 and 54, the jaws on the operator's side of the boom must be located further away than the other jaw. Thus, the relative position of jaws 52 and 54 is dependent on whether the operator control station is located on the left or on the right of the boom. It is therefore an essential feature of the present invention to provide means for interchanging the position of the jaws.

Once a felled tree is gripped by the front jaws 52 and 54, the boom 26 is moved backward by operating motor 40. As the boom moves back, any slack in the hydraulic lines is taken up, in accordance with another feature of the present invention, by movement of carriage 116 in the same direction under the action of sprocket chain 124. This prevents the hydraulic lines from getting tangled into the equipment and into other obstacles on the working site. In accordance with still another feature of the present invention, the boom 26 is well guided both vertically and longitudinally during its movement by means of roller bogeys 28, the function of which has been clearly disclosed previously.

The boom is moved back until the butt of the tree reaches the jaws 58 and 60 located on extension 56 of the tubular member. The motor 40 is then stopped and the jaws 58 and 60 closed on the tree after adequate maneuvering of the regular excavator equipment to grip the butt of the tree. The front jaws 52 and 54 are then slightly released and motor 40 re-energized to move the boom forward. During such forward movement, the tree is delimbed by the cutting edges of the jaws 52 and 54 and the cutting edge 106 of the front plate 70 of the extension 56. Once the boom 26 has reached its most forward position, the motor 40 is stopped, jaws 58 and 60 are released slightly and jaws 52 and 54 are tightened. Motor 40 is then operated to move boom 26 back until it reaches its most backward position. Jaws 58 and 60 are tightened and jaws 52 and 54 released to resume delimbing. This is all possible because the boom 26 is mounted on a wide plate 22 secured to the upper end of boom support 14, so that the trunk of the tree can move freely along the side of the boom support. This feature permits the use of a boom which is much shorter than the one disclosed in Canadian Patent No. 1,055,366 mentioned previously, and which does not require any tensioning wires. When the boom 26 reaches the top of the tree, motor 40 is stopped and cutter 98 is operated by energization of cylinder 102 for the regular power supply of the excavator equipment to cut the top of the tree, as shown in FIG. 3 of the drawings.

Although the invention has been disclosed with reference to a preferred embodiment, it is to be understood that other alternative means of putting into practice are also envisaged and that the invention is to be limited to the scope of the claims only.

What I claim is:

1. A tree-processing unit adapted for installation on a conventional motorized equipment having a main base and a boom support extending upwardly from said main base, said boom support pivotally mounted on said main base about a horizontal axis, comprising:
   (a) a tubular member detachably secured to said boom support;
   (b) an elongated boom extending through both ends of said tubular member;
   (c) means for hingedly mounting said tubular member at the top of said boom support, so as to permit pivotal of said boom support about its horizontal axis to a position substantially parallel to said boom and so reduce the height of the boom above ground to a minimum to permit transportation of the motorized equipment on a trailer under bridges and other overhead obstacles;
   (d) guide means located within the tubular member for supporting and guiding the boom through the tubular member; and
   (e) hydraulically-operated means mounted on said tubular member and on the front end of the boom for gripping and delimbing a felled tree.

2. A tree-processing unit as defined in claim 1, wherein said means for hingedly mounting the tubular member on the top of the boom support, comprises a plate which extends outwardly from said boom support by a predetermined distance, so as to permit movement of the trunk of a tree along the side of the boom support during operation of said hydraulically-operated means.

3. A tree-processing unit adapted for installation on a conventional motorized equipment having a main base, a boom support extending upwardly from said main base, said boom support pivotally mounted on said main base about a horizontal axis, and an operator control station located on the right- or left-hand side of said boom support, comprising:
- (a) a tubular member detachably secured to said boom support;
- (b) an elongated boom extending through both ends of said tubular member;
- (c) guide means located within the tubular member for supporting and guiding the boom through the tubular member;
- (d) hydraulically-operated pairs of jaws pivotally mounted on the tubular member and on the front end of the boom for gripping and delimbing a felled tree;
- (e) means for hingedly mounting said tubular member at the top of said boom support, so as to permit pivotal of said boom support about its horizontal axis to a position substantially parallel to said boom and so reduce the height of the boom above ground to a minimum to permit transportation of the motorized equipment on a trailer under bridges and other overhead obstacles; and
- (f) means for mounting the jaws of each pair in a longitudinally offset position and for permitting interchanging the relative position of the jaws, so that both jaws of each pair can be easily seen by an operator at the operator control station.

4. A tree-processing unit as defined in claim 3, wherein said means for permitting interchanging the position of the jaws includes a pair of pivotal connections located on each side of the tubular member and the front end of the boom, and means for installing the jaws of each pair on one or the other pivotal connection, depending on which side of the boom support the operator control station is located.

* * * * *